(12) United States Patent
Solomon et al.

(10) Patent No.: US 7,237,043 B2
(45) Date of Patent: Jun. 26, 2007

(54) SYSTEM FOR IMPROVING PCI WRITE PERFORMANCE

(75) Inventors: Richard L. Solomon, Colorado Springs, CO (US); Eugene Saghi, Colorado Springs, CO (US); Amanda White, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 104 days.

(21) Appl. No.: 10/718,937

(22) Filed: Nov. 21, 2003

(65) Prior Publication Data

US 2005/0114556 A1  May 26, 2005

(51) Int. Cl.
*G06F 3/00* (2006.01)
*G06F 9/26* (2006.01)
*G06F 13/00* (2006.01)
*G06F 5/00* (2006.01)

(52) U.S. Cl. .................. 710/6; 710/5; 710/36; 710/39; 710/40

(58) Field of Classification Search .................. 710/5, 710/6; 711/154, 155; 712/214, 215
See application file for complete search history.

(56) References Cited

U.S. PATENT DOCUMENTS 6,047,334 A * 4/2000 Langendorf et al. ........... 710/5
6,754,737 B2 * 6/2004 Heynemann et al. .......... 710/39
2001/0037434 A1 * 11/2001 Hughes et al. .............. 711/146

* cited by examiner

*Primary Examiner*—Scott C Sun
(74) *Attorney, Agent, or Firm*—Suiter Swantz PC LLO

(57) ABSTRACT

A method and apparatus for traversing a queue of commands containing a mixture of read and write commands places a Next Valid Write Address pointer in each queue entry. In this manner, time savings are achieved by allowing preprocessing of the next write command to be executed. The method may be practiced by setting a next valid address pointer in all queue entries. Queue traversal may be forward, backward, or bi-directional.

11 Claims, 6 Drawing Sheets

| QUEUE ENTRY | VALID FLAG | DIRECTION | COMMAND | NEXT VALID WRITE ADDR POINTER |
|---|---|---|---|---|
| 0 | YES | INBOUND | READ A | 6 |
| 1 | YES | INBOUND | READ B | 6 |
| 2 | YES | INBOUND | READ C | 6 |
| 3 | YES | INBOUND | READ D | 6 |
| 4 | YES | INBOUND | READ E | 6 |
| 5 | YES | INBOUND | READ F | 6 |
| 6 | YES | OUTBOUND | WRITE G | 8 |
| 7 | YES | INBOUND | READ H | 8 |
| 8 | YES | OUTBOUND | WRITE I | 6 |
| 9 | NO | INBOUND | N/A | 6 |
| 10 | NO | INBOUND | N/A | 6 |
| 11 | NO | INBOUND | N/A | 6 |
| 12 | NO | INBOUND | N/A | 6 |
| 13 | NO | OUTBOUND | N/A | 6 |
| 14 | NO | OUTBOUND | N/A | 6 |
| 15 | NO | INBOUND | N/A | 6 |

FIG. 3

SYSTEM FOR IMPROVING PCI WRITE PERFORMANCE

FIELD OF THE INVENTION

The present invention generally relates to the field of processing a queue, and particularly to a method and apparatus for providing lookahead pipeline processing of WRITE commands in a variable length queue of READ/WRITE commands.

BACKGROUND OF THE INVENTION

A host interface that connects to a bus, such as a Peripheral Component Interconnect (PCI) bus, may include a core. The core manages control circuitry responsible for data transfer to and from a device, such as a storage device, coupled to the bus. Data transfer and other commands may be placed in a queue managed by the core. The core advances from each queue entry to the next, checking a validity flag to determine if the command needs to be issued and a direction flag to determine if the command is a bus read or a bus write instruction. The core does not begin filling an outbound pipeline until actually reaching the command. Higher speed host interfaces such as PCI-X 533 and PCI Express require deep queues. These deep queues add latency to the interface, thereby degrading performance. Deep queues in the bus interface controller add substantial startup latency to outbound (i.e., bus write) commands to fill the pipeline. For example, if the seventh command queue entry were the first write command, then the core would advance through the first six entries by completing READ commands before beginning to fetch the data needed to complete the first WRITE command. Thus, there may be substantial delay between the completion of the sixth READ command and the core beginning the first WRITE command on that bus because the bus would go idle while the core collected the data it needed.

Two approaches have attempted to solve the problem of extended queue latencies. The first solution, shallower pipelines and/or tighter tie-in between core logic and bus interface, is impractical for high speed interfaces which do not allow the interface to be throttled (such as PCI-X and PCI Express). Tying core logic more tightly to the host interface can reduce latency but at the expense of reusability on future interfaces and at the expense of distributing complexity across multiple agents versus a single interface core. The second solution, next command lookahead, only checks the queue entry immediately following the current one and thus may not fully mask pipe fill latency if the current command is small.

Therefore, it would be desirable to provide a more efficient queue management method to reduce overall queue processing time.

SUMMARY OF THE INVENTION

Accordingly, the present invention is directed to a method and apparatus for facilitating queue processing by providing a lookahead pointer for the next write command in a queue. Because write command processing requires the core to collect data from a backend device before beginning the bus transaction, more time is needed to prepare to perform a write command than is needed to prepare to perform a read command. A look ahead ability allowing pipeline filling to occur in parallel with unrelated command processing more efficiently uses command processing time. The present invention provides each queue entry with a pointer to the next valid outbound/write entry in the queue. Thus, pipelines can be filled as soon as space is available and a write command is queued—regardless of the positional relationship in the queue between the current command and the write command.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 3 illustrates an embodiment of a queue of READ/WRITE commands of the present invention;

DETAILED DESCRIPTION OF THE INVENTION

Reference will now be made in detail to the presently preferred embodiments of the invention, examples of which are illustrated in the accompanying drawings.

The present invention relates to a method and apparatus for traversing a queue of commands to effectively identify upcoming write commands in the queue and prepare the data pipeline to more quickly process a write command (or instruction). The core maintains a circular (or linear) buffer (or queue) of commands to process. The queue of commands may include entries for completed commands, interrupted commands, null commands, yet-to-be-completed commands, and the like. The non-completed commands are assigned a tag (i.e., a validity flag) indicating that these commands are valid for reissue. In an embodiment, new commands are always added in order to the logical end of the buffer. Each command entry contains information indicating whether it is a read or write command and whether the entry is valid. Completed commands, no op commands (i.e., instructions that are not intended to cause an action but act as placeholders for future commands), null commands, commands that have been discarded by the controller, and the like are assigned a tag indicating these commands are invalid for reissue. The method employs a Next Valid Write Address pointer to facilitate the processing of write commands for the memory. In a preferred embodiment, all Next Valid Write Address pointers may be updated in parallel by independent logic without the need of a processor to handle Next Valid Write Address pointer management. If valid commands need to be reissued, the queue (or portions of it) must be re-traversed. No direct interaction may be required between queue processing logic and Next Valid Write Address logic. That is, when queue processing logic clears an entry's valid flag, all queue entries are updated. Other embodiments may fill gaps in the queue with newly received commands or may begin the queue at a maximum queue address.

Figure 1:
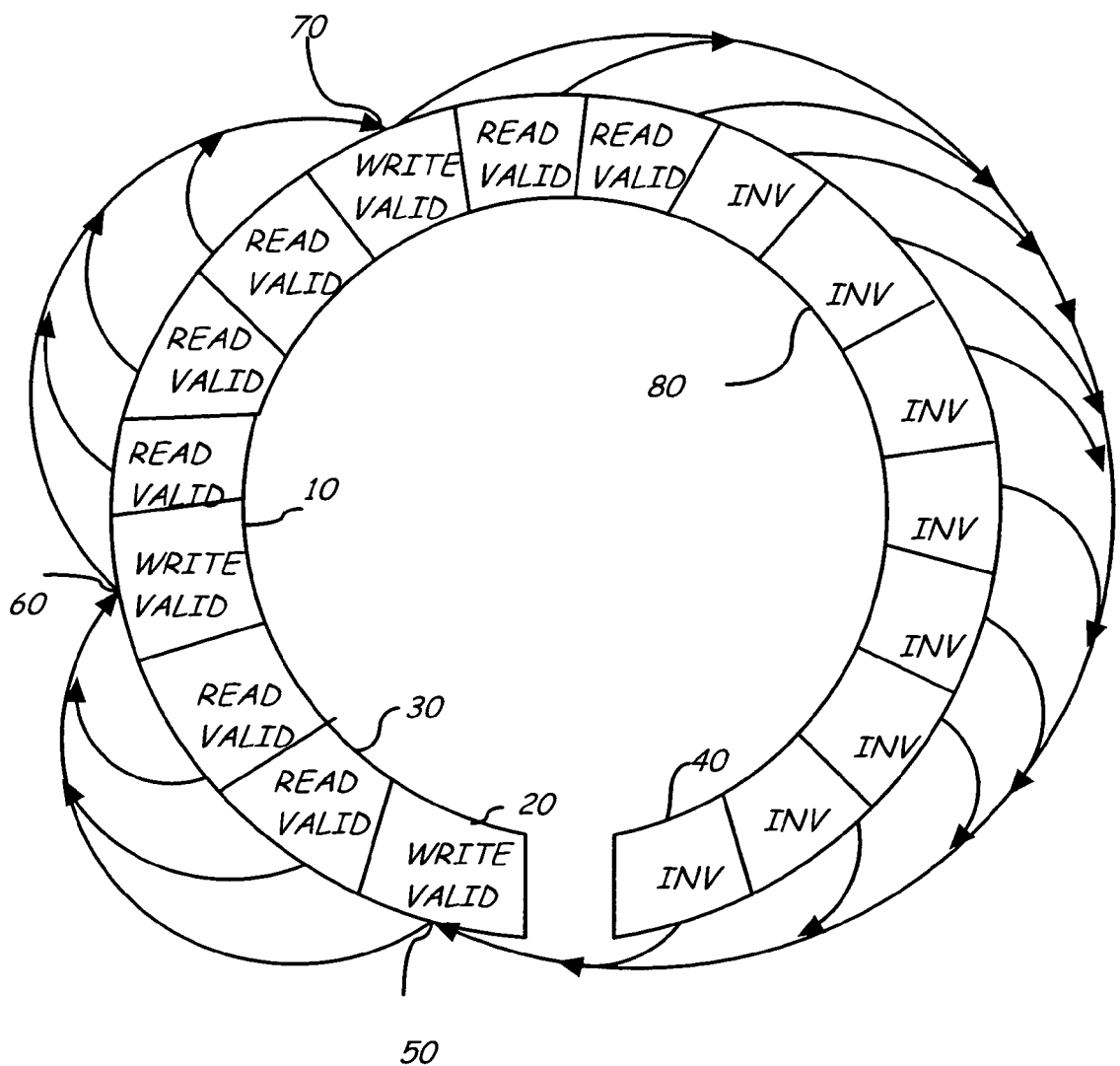
FIG. 1 illustrates an exemplary diagram of the method of the present invention.

FIG. 1 illustrates a diagram of the use of the method of the present invention. A circular queue 10 (or linear queue) contains queue entries. Each queue entry may store a command, data, or another type of instruction. As shown in FIG. 1 the entries all have a Next Valid Write Address pointer that points to a successor entry having a valid write command. For example, queue entry 30 contains a valid READ command and has a Next Valid Write Address pointer that points to queue entry 60 containing a valid WRITE command. Even queue entries that hold invalid commands, such as queue entry 80, have an updateable field for the Next Valid Write Address pointer. The read and write commands may be processed in sequence such that a lower numbered queue entry instruction is processed before a higher numbered queue entry is processed. During command operations, as long as the Outbound pipeline is filled to less than capacity and has already loaded all data required for any current Write instruction, processing to fill the pipeline occurs for the next Write instruction as indicated by the Next Valid Write Address pointer in the queue entry for the command. As illustrated by FIG. 1, queue entries 20, 60, 70 have valid Write commands and have Next Valid Write Address pointers that point to the next queue entry in a given direction along the circular queue.

Figure 2:
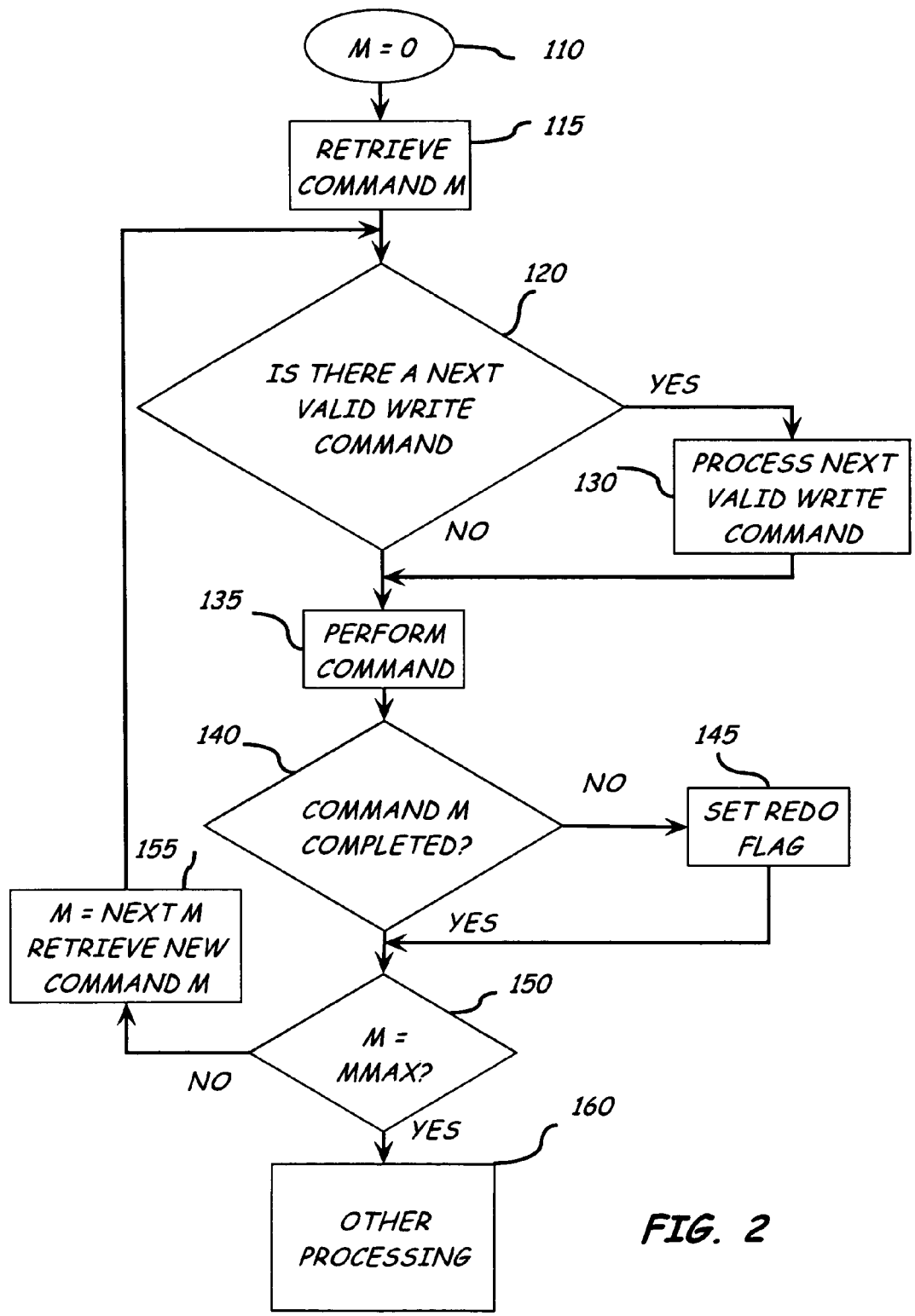
FIG. 2 illustrates an embodiment of a method of present invention for determining which commands are to be reissued.

FIG. 2 illustrates a flowchart of method steps in the preferred embodiment of the present invention. The validity flag initially is cleared or reset, signifying that there is no command to be processed in the queue. The queue of commands is filled partly or entirely. Each queue entry that has a valid command also has a validity flag set. The first command M is retrieved 115 if it is determined that there is a next valid write command 120, processing commences for the next write command 130 as indicated by a Next Valid Write Address pointer contained within the queue entry of command M. Data is accumulated through the data pipeline during this time. Write Look Ahead (WLA) occurs even during a write command. That is, if write B immediately follows write A, the pipeline will fill data for write B as soon as it has 1) fetched the final data for write A and 2) there is available space. Preferably, the write look ahead processing occurs in parallel to normal command processing and may be considered a part of pipeline logic. The outbound pipeline logic begins filling for a first write command A, and only stops when it reaches the end of that command. Filling will pause when the pipeline becomes full and will resume after the data has been written on the bus. Only when the command processing logic reaches write command A will the Next Valid Write Address pointer reflect any possible write command B—at which point the pipeline logic will again begin filling—this time for write B. (Note that while each entry in the command queue has its own Next Valid Write Address pointer, the command processing logic uses the Next Valid Write Address pointer associated with the current command.) In another embodiment, when command M is retrieved, any concurrent write operations are terminated. The operation is performed and the validity flag for that queue entry is cleared 140. If command M is a read command, the read operation is performed according to the op code and parameters stored in the queue entry for command M 135. If command M is not completed because of a time out, the detection of data corruption, or another fault condition 140, an optional REDO flag may be set 145. In an optional redo process, the commands that are determined to have failed may be processed again in another pass through the queue. The present invention even allows multiple passes through the queue to allow processing of all stored commands. A limit may be placed on the number of redo stages for a queue to avoid system hang-ups. For example, a counter may be employed to count the number of stages per queue. If a threshold is reached, the processor issues an alert to an operator, enacts a bypass procedure, or performs other operations. A counter threshold may be hardwired or presettable by the processor, either automatically or through operator entry. If the last command in the queue has been traversed 150, other processing 160 may be performed. The other processing includes the optional redo process. Otherwise, the next queue entry is retrieved 155.

Exemplary code for assigning a Next Valid Write Address, according to the method of FIG. 2, is shown below in an example for the first two entries of a sixteen entry capacity queue. A sixteen-bit status word "Valid" contains a valid flag bit for each of the entries. A second sixteen-bit status word "Writes" contains a flag bit for each entry, set to 1 if that entry contains a write command, and 0 otherwise. The queue may have a different number of entries, such as eight or thirty two, in which case the status words may contain the same number of bits as there are entries. In a preferred embodiment, an intermediate status word "ValidWrites" is created from the bitwise Boolean "AND" of these two words. Thus, ValidWrites contains a bit pattern in which 1's indicate slots containing a command which is both valid and a write. The Next Valid Write Address is calculated independently and in parallel based only on this intermediate status word. Synthesis constraints ensure the NextValidWriteAddr values are valid before the next clock edge after any valid flag changes. Hardware and/or software process logic ensures that the current queue pointer is not updated until that time. Each entry's Next Valid Write Address may be generated combinatorially from the flags of all entries via a priority scheme, as illustrated below for the first two entries of the queue.

```
Assign ValidWrites = (Valid & Writes);
Assign AnyValidWrites = | ValidWrites;
always @ (ValidWrites) begin
casex (ValidWrites)
16'bXXXX_XXXX_XXXX_XX1X:     NextValidWriteAddr0 = 4'h1;
16'bXXXX_XXXX_XXXX_X10X:     NextValidWriteAddr0 = 4'h2;
16'bXXXX_XXXX_XXXX_100X:     NextValidWriteAddr0 = 4'h3;
16'bXXXX_XXXX_XXX1_000X:     NextValidWriteAddr0 = 4'h4;
16'bXXXX_XXXX_XX10_000X:     NextValidWriteAddr0 = 4'h5;
16'bXXXX_XXXX_X100_000X:     NextValidWriteAddr0 = 4'h6;
16'bXXXX_XXXX_1000_000X:     NextValidWriteAddr0 = 4'h7;
16'bXXXX_XXX1_0000_000X:     NextValidWriteAddr0 = 4'h8;
16'bXXXX_XX10_0000_000X:     NextValidWriteAddr0 = 4'h9;
16'bXXXX_X100_0000_000X:     NextValidWriteAddr0 = 4'hA;
16'bXXXX_1000_0000_000X:     NextValidWriteAddr0 = 4'hB;
16'BXXX1_0000_0000_000X:     NextValidWriteAddr0 = 4'hC;
16'bXX10_0000_0000_000X:     NextValidWriteAddr0 = 4'hD;
16'bX100_0000_0000_000X:     NextValidWriteAddr0 = 4'hE;
16'b1000_0000_0000_000X:     NextValidWriteAddr0 = 4'hF;
16'b0000_0000_0000_000X:     NextValidWriteAddr0 = 4'h0;
endcase
end
always @ (ValidWrites) begin
casex (ValidWrites)
```

-continued

```
16'bXXXX_XXXX_XXXX_X1XX:      NextValidWriteAddr0 = 4'h2;
16'bXXXX_XXXX_XXXX_10XX:      NextValidWriteAddr0 = 4'h3;
16'bXXXX_XXXX_XXX1_00XX:      NextValidWriteAddr0 = 4'h4;
16'bXXXX_XXXX_XX10_00XX:      NextValidWriteAddr0 = 4'h5;
16'bXXXX_XXXX_X100_00XX:      NextValidWriteAddr0 = 4'h6;
16'bXXXX_XXXX_1000_00XX:      NextValidWriteAddr0 = 4'h7;
16'bXXXX_XXX1_0000_00XX:      NextValidWriteAddr0 = 4'h8;
16'bXXXX_XX10_0000_00XX:      NextValidWriteAddr0 = 4'h9;
16'bXXXX_X100_0000_00XX:      NextValidWriteAddr0 = 4'hA;
16'bXXXX_1000_0000_00XX:      NextValidWriteAddr0 = 4'hB;
16'bXXX1_0000_0000_00XX:      NextValidWriteAddr0 = 4'hC;
16'bXX10_0000_0000_00XX:      NextValidWriteAddr0 = 4'hD;
16'bX100_0000_0000_00XX:      NextValidWriteAddr0 = 4'hE;
16'b1000_0000_0000_00XX:      NextValidWriteAddr0 = 4'hF;
16'b0000_0000_0000_00X1:      NextValidWriteAddr0 = 4'h0;
16'b0000_0000_0000_00X0:      NextValidWriteAddr0 = 4'h1;
endcase
end
```

Figure 8:
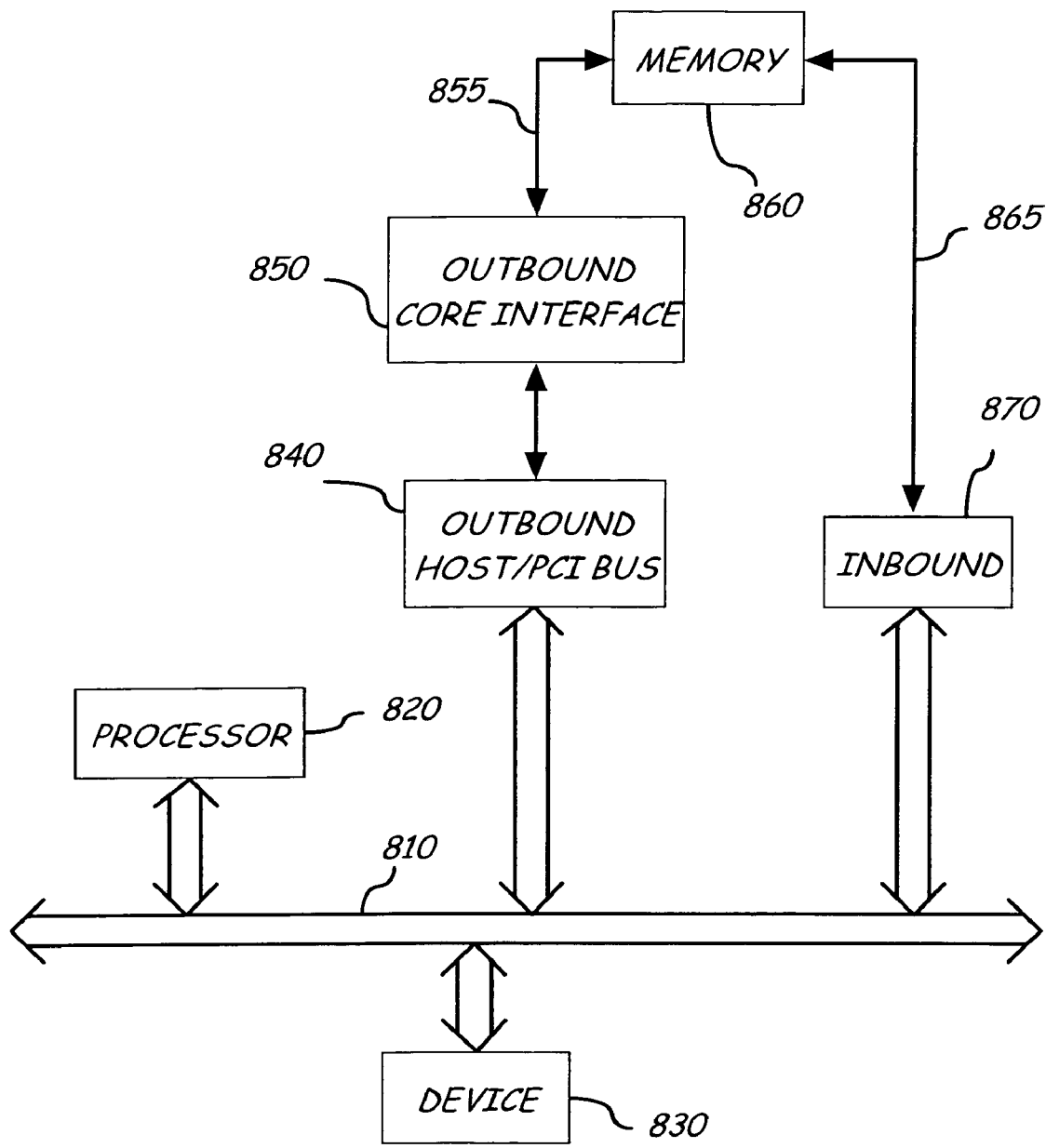
FIG. 8 illustrates an exemplary system of the present invention.

FIG. 3 shows a diagram of a queue according to an embodiment of the present invention. The core maintains a circular buffer of commands to process. New commands are always added in order to the logical end of the buffer. Each command entry contains information including whether the command is a read or a write command and whether the entry is valid. Separate interfaces are provided for Inbound (i.e., bus read) and Outbound (i.e., bus write) transactions. If the inbound state machine is processing READ A from entry 0, the Outbound backend state machine reads entry 0's NextValidWriteAddr to begin processing entry 6 for WRITE G. This arrangement provides the backend state machine with the entire execution time for READ commands A–F to fill its pipeline for WRITE G, greatly increasing the probability that WRITE G can begin execution immediately after the completion of READ F. Furthermore, the Outbound pipeline can be filled beyond its minimum required depth—which potentially allows other use of the backend bus 855 (as shown in FIG. 8). The signal AnyValidWrites may be used to inform the state machines of the condition in which there are no valid writes in the queue and the NextValidWriteAddr field must be ignored. Alternatively, the Next Valid Write Addr fields of all queue entries may be set to the NULL character. In one embodiment, the command queue maintains a vector Valid composed of the valid flags from all 16 queue entries and a vector Writes composed of the write flags from all 16 queue entries. The vectors may be implemented as separate arrays in hardware and/or software. The vectors are AND'ed together to produce the vector ValidWrites which is used to combinatorially create each queue entry's NextValidWriteAddr entry via a priority scheme, as shown in FIG. 3. By the nature of the automatic updating, every entry contains a correct Next Valid Write Address value, regardless of the entry's validity. The method may be varied in an alternative embodiment such that each queue entry contains both a Next Valid Write Address pointer and a next valid read address pointer. Although the valid (or validity) flag has been described as being part of the queue entry, the valid flag may be stored in another kind of data structure, such as a separate array. The value of the valid flag may be numeric (e.g., binary) or logical (e.g., TRUE or FALSE). Similarly, the Next Valid Write Address Pointer values and the commands may each be stored in separate arrays.

Figure 4:
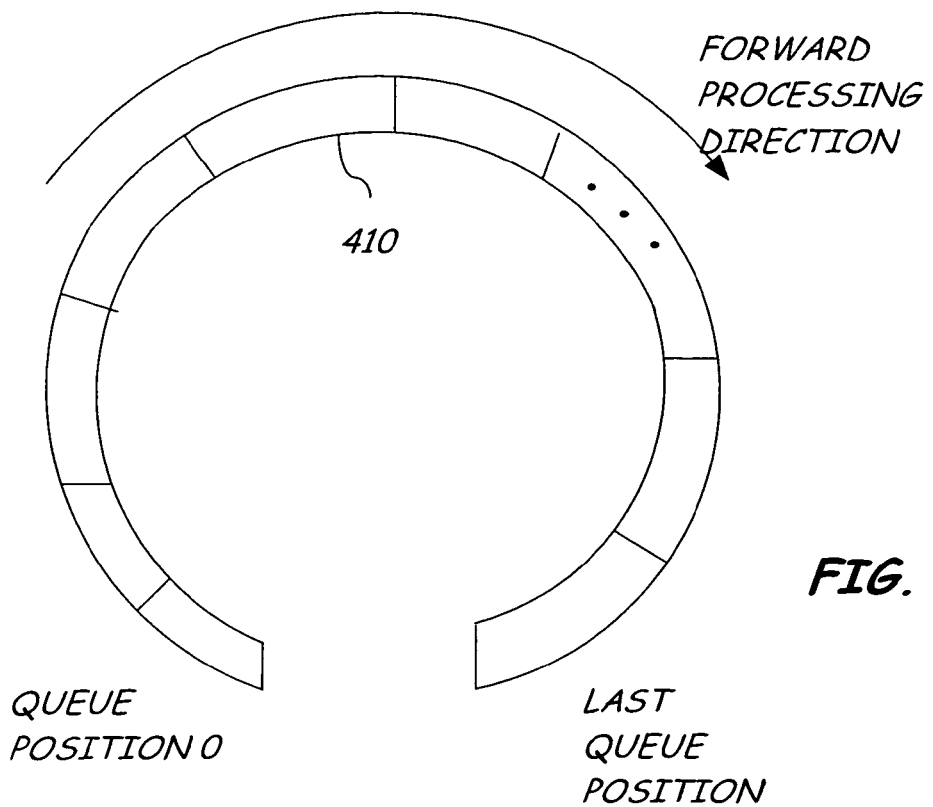
FIG. 4 illustrates a forward traversal of a circular queue in an embodiment of the method of the present invention.
Figure 5:
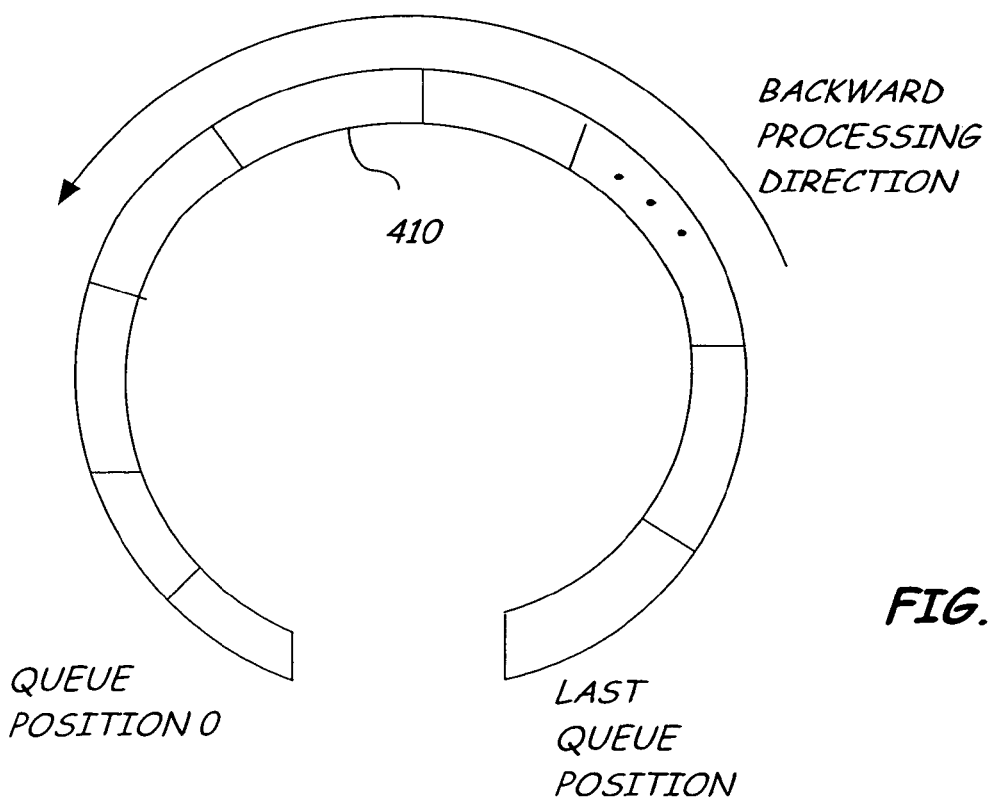
FIG. 5 illustrates a backward traversal of a circular queue in an embodiment of the method of the present invention.
Figure 6:
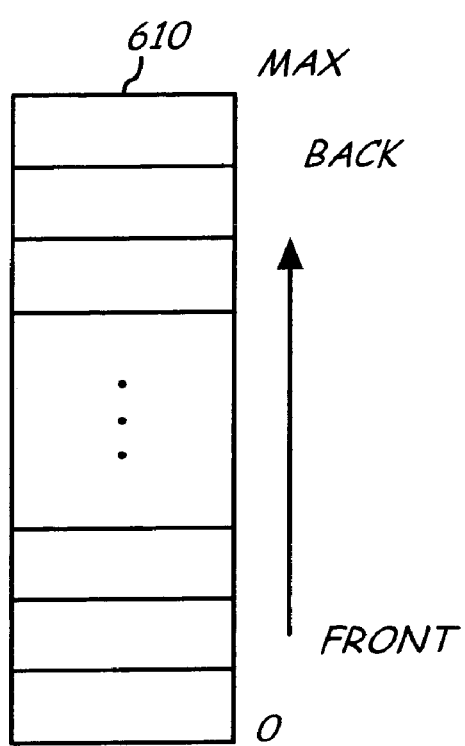
FIG. 6 illustrates a forward traversal of a linear queue in an embodiment of the method of the present invention.
Figure 7:
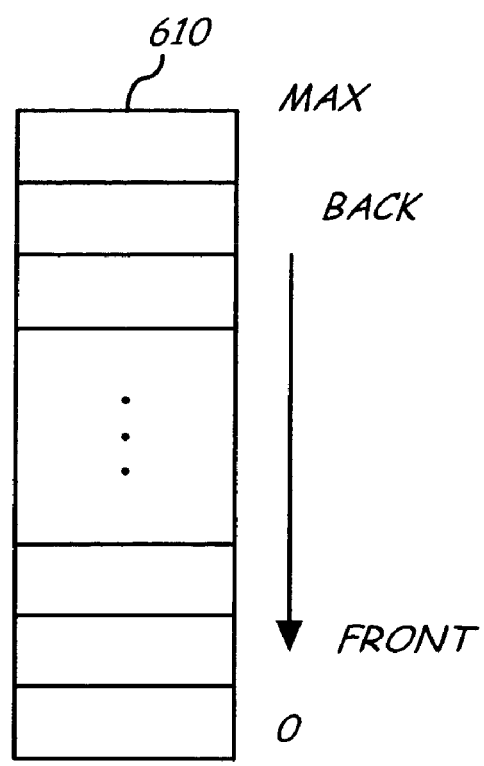
FIG. 7 illustrates a backward traversal of a linear queue in an embodiment of the method of the present invention.

FIGS. 4–7 illustrate various queue traversal schemes. FIGS. 4 and 5 show circular queues 410 traversed in a forward direction and a backward direction, respectively. Similarly, FIGS. 6 and 7 show linear queues 610 traversed in a forward direction and a backward direction. The method of the present invention may be adapted to permit traversal of a queue in either direction or in alternating directions. If the queue were traversed in alternating directions, the number of entries traversed per cycle may be independently settable for the forward direction and the backward direction. Partial queue traversals and traversals over only a portion of a queue are contemplated by the method of the present invention. Two pointers, NextValidWriteAddr and PreviousValidWriteAddr, may need to be maintained per queue entry to accommodate bi-directional traversal.

FIG. 8 illustrates a functional block diagram of an embodiment of a system of the present invention that uses a processor. The device 830 performs operations in accordance with the queue commands. The processor 820 controls the issuance of the commands and executes instructions to implement the traversal method of the present invention. The processor 820 and the device 830 are coupled to each other and to a memory 860 through a bus 810. Furthermore, separate interfaces are provided for Inbound (bus read) and Outbound (bus write) transactions. The Outbound bus interface state machine is partitioned into a front end (i.e., Host/PCI bus) and back end (i.e., core interface) state machine. In this manner, the back end machine may begin filling its pipeline independently of the current command executing. The Inbound bus interface 870 and Outbound core interface 850 may access the memory 860 simultaneously, through arbitration, or sequentially as determined by the queue order. The Inbound bus interface 850 may have a front end bus 855 that is independent of the backend bus 865 of the Inbound bus interface 870. The bus may be a Peripheral Component Interface Extended (PCI-X) bus or other suitable bus. The processor 820 may be a PCI-X core. The device may be a redundant array of disks subsystem, another form of storage device, and the like.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. Features of any of the variously described embodiments may be used in other embodiments. The form herein before described being merely an explanatory embodiment thereof. It is the intention of the following claims to encompass and include such changes.

What is claimed is:

1. A method for performing input/output operations on a memory by traversing a queue of commands, comprising the steps of:
    accessing a queue entry of a queue of at least two commands;
    determining the queue entry includes a valid command;
    determining the valid command is a read command;
    determining a Next Valid Write Address pointer field of the queue entry holds a valid write address pointer;
    using the Next Valid Write Address pointer of the queue entry to access a second queue entry; and
    commencing to fill a pipeline for the write command corresponding to the second queue entry.

2. The method of claim 1, further comprising the step of performing the read command if the valid command is a read command.

3. The method of claim 1, further comprising the step of allowing a concurrent write command to complete before determining if the Next Valid Write Address pointer field of the queue entry holds a valid write address pointer.

4. The method of claim 1, further comprising the step of terminating any concurrent write commands in progress before determining if the Next Valid Write Address pointer field of the queue entry holds a valid write address pointer.

5. The method of claim 1, further comprising the step of processing the valid command that is a read command while determining if the Next Valid Write Address pointer is valid.

6. The method of claim 5, further comprising the step of accessing the queue entry corresponding to the Next Valid Write Address pointer if the Next Valid Write Address pointer is valid.

7. The method of claim 6, further comprising the step of determining if a command at the queue entry corresponding to the Next Valid Write Address pointer is a valid write command.

8. The method of claim 7, further comprising the step of preparing data in an outbound pipeline in anticipation of the valid write command being processed if the command at the queue entry is determined be a valid write command.

9. The method of claim 8, further comprising the step of advancing through the queue of entries such that for each just accessed queue entry, a command at a just accessed queue entry is performed.

10. The method of claim 9, wherein the command at the just accessed queue entry is another read command.

11. The method of claim 10, wherein the command at the just accessed queue entry is the write command.

* * * * *